United States Patent
Zeng

(10) Patent No.: US 7,203,234 B1
(45) Date of Patent: Apr. 10, 2007

(54) METHOD OF DIRECTIONAL FILTERING FOR POST-PROCESSING COMPRESSED VIDEO

(75) Inventor: Wenjun Zeng, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/541,141

(22) Filed: Mar. 31, 2000

(51) Int. Cl.
*H04B 1/66* (2006.01)

(52) U.S. Cl. .................... 375/240.03; 375/240.29; 375/240.25; 375/240.26; 375/240.16; 382/251; 382/260; 382/269; 382/268; 382/266; 382/233; 348/699

(58) Field of Classification Search .......... 375/240.03, 375/240.29, 240.25, 240.02, 240.26, 240.24, 375/240.15, 240.16; 382/268, 233, 264, 382/260, 269, 251, 266; 348/607, 625, 628, 348/629, 699
See application file for complete search history.

(56) References Cited

U.S. PATENT DOCUMENTS

| | | | |
|---|---|---|---|
| 3,976,361 A | 8/1976 | Fraas et al. | |
| 4,038,686 A | 7/1977 | Baker | |
| 4,620,699 A | 11/1986 | Landa et al. | |
| 4,871,257 A | 10/1989 | Suzuki et al. | |
| 4,873,135 A | 10/1989 | Wittnebel et al. | |
| 4,921,241 A | 5/1990 | Landa et al. | |
| 4,921,344 A | 5/1990 | Duplantis | |
| 4,954,784 A | 9/1990 | Kitamura | |
| 5,210,555 A | 5/1993 | Ishikura et al. | |
| 5,219,686 A | 6/1993 | Kamon | |
| 5,359,676 A | 10/1994 | Fan | |
| 5,367,385 A * | 11/1994 | Yuan | 358/465 |
| 5,475,434 A * | 12/1995 | Kim | 375/240.24 |
| 5,488,651 A | 1/1996 | Giler et al. | |
| 5,524,067 A | 6/1996 | Miyake et al. | |

(Continued)

FOREIGN PATENT DOCUMENTS

EP 0 666 695 A2 1/1995

(Continued)

OTHER PUBLICATIONS

IEEE Transactions on Circuits and Systems for Video Technology, vol. 3, No. 6, Yang et al., Regularized Reconstruction to Reduce Blocking Artifacts of Block Discrete Cosine Transform Compressed Images, Dec. 1993.

(Continued)

*Primary Examiner*—Shawn S. An
(74) *Attorney, Agent, or Firm*—Chernoff, Vilhauer, McClung & Stenzel

(57) ABSTRACT

A method of post-processing decompressed images includes identification of the direction of an image edge in a pixel block of the image and filtering applied along the boundary of the block in a direction substantially parallel to the detected image edge. Pixels are selected for filtering on the basis of the quantization parameter of the block of which they are members, the relative difference between pixels adjacent to the block boundary, and significant changes value of pixels in a filtering segment. Filtering is applied parallel to the detected edge to protect the sharpness of the edge while reducing or eliminating blocking and ringing artifacts. A method of separately post-processing fields of interlaced video eliminating complications arising from separate compression of the fields is also disclosed.

14 Claims, 2 Drawing Sheets

U.S. PATENT DOCUMENTS

| | | | |
|---|---|---|---|
| 5,534,777 | A | 7/1996 | Fuderer et al. |
| 5,556,920 | A | 9/1996 | Tanaka et al. |
| 5,590,064 | A * | 12/1996 | Astle .................. 375/240.14 |
| 5,621,467 | A * | 4/1997 | Chien et al. ........... 375/240.15 |
| 5,625,714 | A * | 4/1997 | Fukuda .................. 382/233 |
| 5,644,513 | A | 7/1997 | Rudin et al. |
| 5,729,242 | A | 3/1998 | Margerum et al. |
| 5,754,702 | A * | 5/1998 | Simpson .................. 382/240 |
| 5,796,875 | A | 8/1998 | Read |
| 5,819,035 | A | 10/1998 | Devaney et al. |
| 5,850,294 | A | 12/1998 | Apostolopoulos et al. |
| 5,852,475 | A | 12/1998 | Gupta et al. |
| 5,852,498 | A | 12/1998 | Youvan et al. |
| 5,877,813 | A | 3/1999 | Lee et al. |
| 5,883,983 | A | 3/1999 | Lee et al. |
| 5,903,317 | A | 5/1999 | Sharir et al. |
| 5,920,356 | A | 7/1999 | Gupta et al. |
| 6,069,670 | A * | 5/2000 | Borer .................. 348/620 |
| 6,226,050 | B1 * | 5/2001 | Lee .................. 348/607 |
| 6,504,873 | B1 * | 1/2003 | Vehvilainen ........... 375/240.29 |
| 6,594,400 | B1 * | 7/2003 | Kim .................. 382/268 |
| 6,707,952 | B1 * | 3/2004 | Tan et al. .................. 382/268 |

FOREIGN PATENT DOCUMENTS

| | | |
|---|---|---|
| EP | 1 146 748 A2 * | 10/2001 |
| WO | WO 91/14340 | 9/1991 |
| WO | WO 93/22742 | 11/1993 |

OTHER PUBLICATIONS

IEEE Transactions on Circuits and Systems for Video Technology, vol. 5, No. 4, Kuo et al., "Adaptive Postprocessor for Block Encoded Images" Aug. 1995.

IEEE Transactions on Circuits and Systems for Video Technology, vol. 5, No. 4, O'Rourke et al., "Improved Image Decompression for Reduced Transform Coding Artifacts", Dec. 1995.

IEEE Transactions on Image Processing, vol. 6, No. 10, Yang et al., "Removal of Compression Artifacts Using Projections onto Convex Sets and Line Process Modeling", Oct. 1997.

Sheng et al., Fast Compression Artifact Reduction Technique Based on Nonlinear Filtering, ISCAS 1999.

MPEG4 Video Verification Model, Appendix C, pp. 216-220.

A.C. Kokaram and P.J.W. Rayner, "A System for the Removal of Impulsive Noise in Image Sequences," SPIEE vol. 1818 Visual Communications and Image Processing 1992, Department of Engineering, University of Cambridge, Trumpington St. CB2 1PZ, Cambridge U.K., pp. 322-331.

Pekka Heinonen and Yrjo Neuvo, "FIR-Median Hybrid Filters," IEEE Transactions on Acoustics, Speech, and Signal Processing, vol. ASSP-35, No. 6, Jun. 1987, pp. 832-838.

Bhaskar Ramamurthi and Allen Gersho, "Nonlinear Space-Variant Postprocessing of Block Coded Images," IEEE Transactions on Acoustics, Speech, and Signal Processing, vol. ASSP-34, No. 5, Oct. 1986, pp. 12581268.

Yo-Sung Ho and Allen Gersho, 1440/SPIE vol. 1199 *Visual Communications and Image Processing IV* (1989), "Contour-Based Postprocessing of Coded Images," pp. 1440-1449.

Int'l Organization for Standardization, MPEG-4 Video Verification Model Version 8.0, ISO/IEC JTCI/SC29/WG11, MPEG97/N1796, Stockholm, Jul. 1997.

* cited by examiner

US 7,203,234 B1

METHOD OF DIRECTIONAL FILTERING FOR POST-PROCESSING COMPRESSED VIDEO

BACKGROUND OF THE INVENTION

The present invention relates to post-processing of decompressed digital images and, more particularly, to a method of directional, selective filtering of decompressed images.

Transform coding is a common method for compressing digital images. For examples, transform coding is featured in the JPEG (ISO 10918) standard related to still images and the MPEG-2 (ISO/IEC 13818) standard related to motion video. Generally, transform coding involves subdividing an image into smaller blocks or groups of pixels, applying a "reversible transform" (such as the Discrete Cosine Transform (DCT)) to the pixels of the blocks, quantizing the frequency coefficients produced by the transform, and coding of the results. While transform coding can achieve a high compression ratio, information in the original image is discarded in the compression-decompression process degrading the decompressed image, especially in video sequences with considerable motion.

Decompressed transform coded images may include visible artifacts of the compression-decompression process. A common artifact is the "blocking" effect, also known as "grid noise." The blocking effect is the result of the process of approximating each of the frequency coefficients produced by the transform as one of a limited number of permitted values during the quantization step. The encoder selects a quantization parameter establishing the difference between successive permitted values and assigns each frequency coefficient to the nearest permitted value. As a result of the "rounding off" during quantization, adjacent pixels may have different quantized values even though their colors were nearly the same in the original image causing individual blocks to be visible in the decompressed image. This is a particular problem in areas of uniform color and along color boundaries. In addition, the decompressed image may exhibit "staircase noise," a term which is descriptive of an appearance of an edge in the image. The staircase appearance is the result of enhancement of the blocking effect for blocks lying across an edge in an image. A third artifact of interest in decompressed images is the so called "ringing artifact" that produces jagged or fuzzy lines in the vicinity of sharp edges. All of these artifacts can be annoying to viewers of the image. Accordingly, images are processed after decompression (post-processed) to reduce or eliminate some or all of these artifacts.

Several methods have been used to remove or reduce annoying artifacts in decompressed images. Some methods attempt to recover the original image from the decompressed image and knowledge of the smoothness properties of the image before compression. Generally, these methods are complex and often iterative limiting their usefulness in real time video applications.

Filtering may also be applied to the image pixels to reduce artifacts of the compression process. For example, filtering may be applied to pixel segments of rows or columns normal to the block boundaries to smooth the color or grayscale transition across the boundary, thereby reducing the blocking effect. Classification of the block's neighborhood and filtering based on the classification can be part of the filtering process. While filtering pixel segments normal to block boundaries is useful in addressing the blocking effect, it does not necessarily address ringing artifacts. Further, edges may be filtered and some portions of diagonal edges may be filtered repeatedly, adversely impacting the sharpness of the decompressed image.

What is desired, therefore, is a computationally conservative method of post-processing a decompressed image that effectively addresses both blocking and ringing artifacts but preserves the sharpness of edges in the image.

SUMMARY OF THE INVENTION

The present invention overcomes the aforementioned drawbacks of the prior art by providing a method of post-processing a decompressed image comprising the steps of establishing a filtering axis aligned relatively parallel to an image edge in a block of image pixels and selectively filtering a plurality of pixels arrayed substantially parallel to the filtering axis. Filtering the pixels of a block in a direction substantially parallel to an image edge in the block minimizes any impact on the sharpness of the edge. Further, the method conserves computational resources by selecting pixels for filtering that exhibit a difference from their neighbors that is likely to produce a visual artifact. Pixels that are members of blocks not likely to exhibit a blocking effect are not filtered. Further, pixels at block boundaries having values sufficiently close so as not to produce a noticeable artifact and pixels representing details are not filtered. The method can also be applied separately to the images contained in individual fields of interlaced video to avoid image complications arising from the separate processing, including compression, of the fields.

The foregoing and other objectives, features and advantages of the invention will be more readily understood upon consideration of the following detailed description of the invention, taken in conjunction with the accompanying drawings.

DETAILED DESCRIPTION OF THE PREFERRED EMBODIMENT

Figure 1:
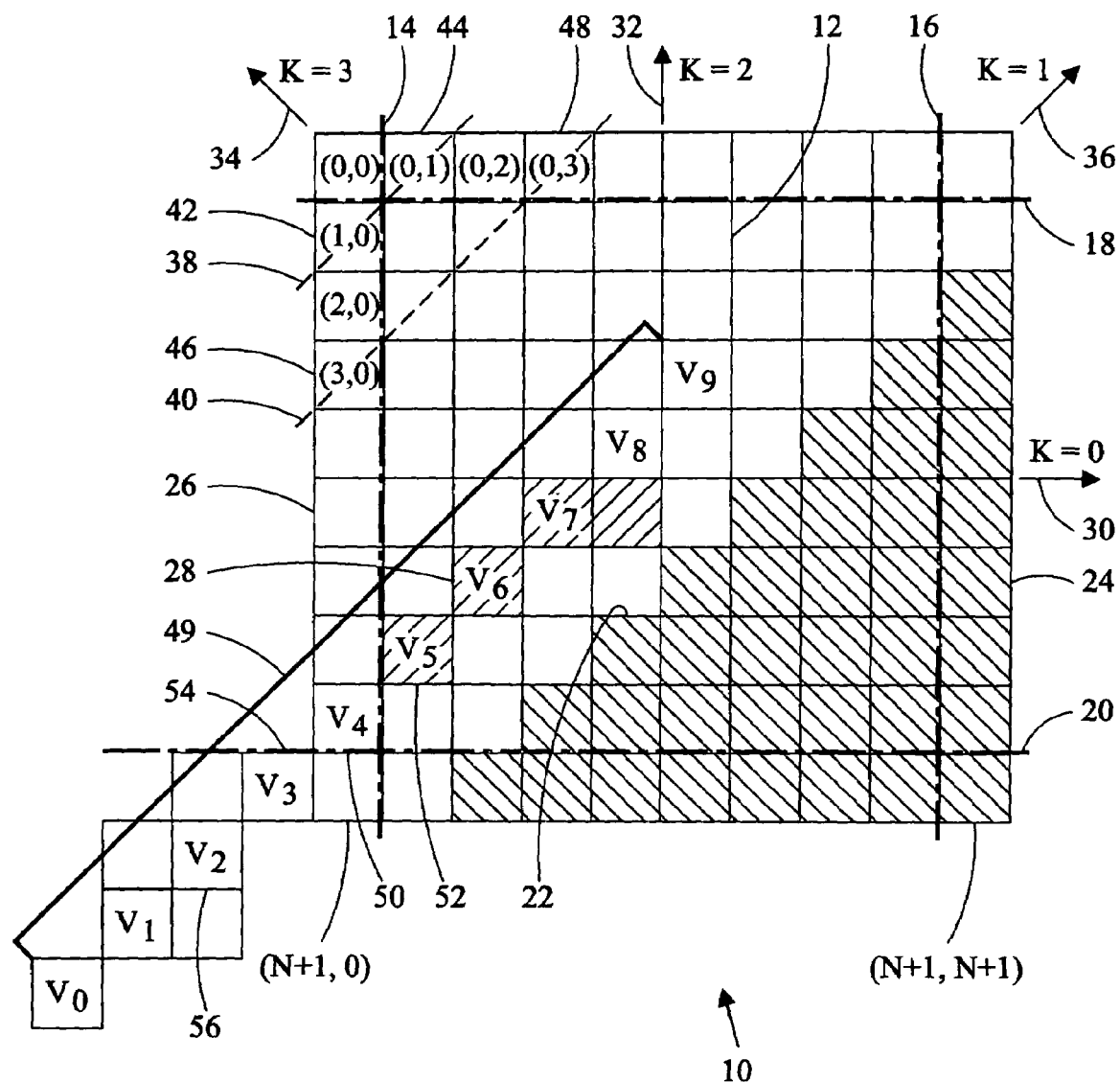
FIG. 1 is a schematic drawing of pixels of an exemplary area of a decompressed image.

In the transform coding process an N (pixel)×N (pixel) image is subdivided into n×n sub-images or blocks and the transform is applied to the individual pixels on a block by block basis. For example, in the Discrete Cosine Transform (DCT) compression process utilized by in the JPEG (ISO 10918) and MPEG-2 (ISO/IEC 13818) image compression processes the image is subdivided into 8×8 blocks for coding. FIG. 1 illustrates a portion of a larger image 10 that has been subdivided into blocks, such as the block 12 that is bounded by the block boundaries 14, 16, 18, and 20. Pixels outside of the area bounded by the block boundaries are pixels included in adjacent blocks. An image edge 22, formed by the boundaries of pixels of a first 24 and second 26 color divides the block 12 diagonally. It is understood that a block of pixels, as used herein, may be any plurality of pixels defining any pattern.

Decompressed images may exhibit several artifacts of the compression-decompression process. The most prevalent artifact of compression is the blocking effect where the blocks created for image compression are visually perceptible in the decompressed image. In the DCT transform coding compression process, the spatial domain signal for a block is converted to a block of coefficients in the frequency domain by the application of the transform. The resulting frequency coefficients are quantized or approximated as one of a limited number of discrete values permitted by the encoder. Since large areas of an original image may be of relatively uniform color or grayscale, the "rounding off" process performed by the encoder may result in pixels of nearly the same original color being assigned quantized values that are visually significantly different. When the image is decompressed, the color or grayscale difference of the pixels may be sufficient to be noticeable. This is a particular problem at the boundaries of adjacent blocks in areas of relatively uniform color. The severity of the blocking effect is a function of the distance between successive potential quantized values or the quantization parameter selected by the encoder. Post-processing (often by filtering) may be applied to smooth the change across block boundaries to reduce or eliminate the blocking effect or grid noise.

Filtering a segment of a horizontal row or vertical column of pixels along each boundary of each block of an image is a computationally resource intensive process. In addition, filtering a column or row of pixels extending to the center of the block 12 would result in filtering of the image edge 22. Some portions of a diagonal image edge, such as edge 22, may be filtered more than once. As a result, the sharpness of edges in the decompressed image will be degraded. The present inventor realized that computational resources can be conserved by selectively filtering pixels within selected blocks of an image where an artifact may be a problem. Further, the inventor realized that the sharpness of edges and, therefore, the quality of the decompressed image can be improved by selectively filtering pixels along an axis aligned generally parallel to the direction of an image edge. In the present invention, the direction of an image edge is detected and filtering is selectively applied to pixels arrayed along a filtering axis which aligned relatively parallel to the direction of an image edge in a block.

In addition to the blocking effect, decompressed images may exhibit ringing artifacts that often appear as noisy lines in the vicinity of and approximately paralleling an image edge. In FIG. 1 a ringing artifact is illustrated by pixels of a third color 28 in the vicinity of the edge 22. A decompressed image may also exhibit "staircase noise," a term which is descriptive of an appearance of an edge in the image. The staircase appearance is the result of enhancement of the blocking effect for blocks lying across an edge 22 in an image.

Figure 2:
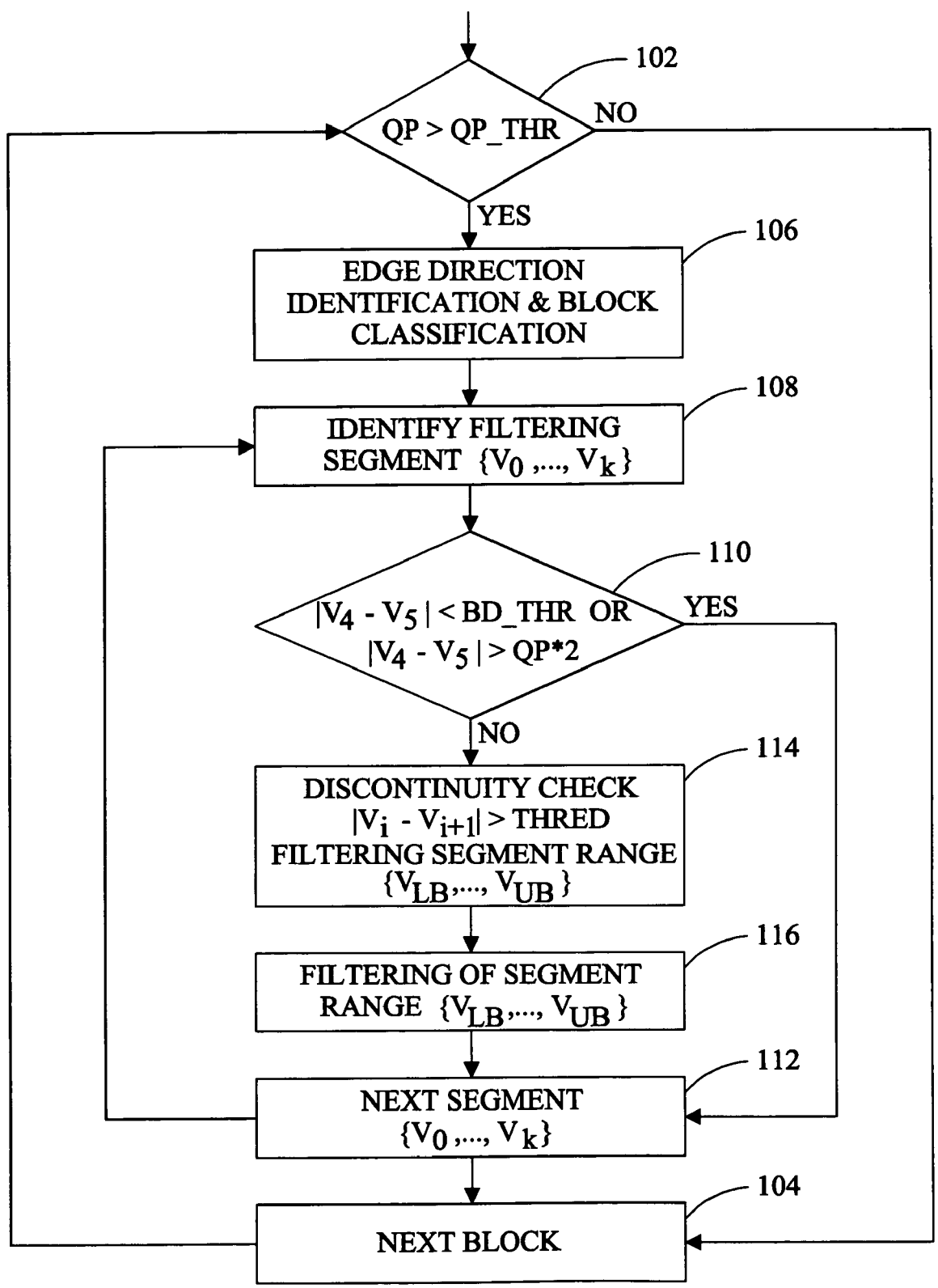
FIG. 2 is a flow diagram of the post-processing method of the present invention.

The steps of the post-processing technique of the present invention are illustrated in FIG. 2. To avoid over smoothing the image and conserve computational resources, filtering is selectively applied to the pixels of selected blocks of the image. In a block selection step, the quantization parameter (QP) for each block is extracted from the data stream and compared to a predetermined quantization parameter threshold (QP_THR) 102. The quantization parameter threshold is a selected maximum distance between quanta that produces a visually acceptable transition across the block boundary. If the quantization parameter is less than the threshold, the quantization error is not likely to create significant grid noise and an objectionable blocking artifact. If this is the case, the method selects the next block for examination 104 without filtering the current block. If the quantization parameter exceeds the quantization parameter threshold, the block is designated for filtering.

If a block of pixels is to be filtered, the most dominant direction of an image edge in the block is determined 106.

The edge direction is determined by comparing pixels in the vicinity of opposing boundaries of the block and located on projections of candidate filtering axes. Referring again to FIG. 1, the edge detection investigation may be performed in the directions of four candidate axes; horizontal (k=0) 30, vertical (k=2) 32, and the 45° diagonals (k=3) 34 and (k=1) 36, to determine the dominant direction of the exemplary edge 22 in the block 12. The investigation could proceed along different, additional or intermediate candidate axes (for example, 22.5°) but the required additional computation may not be justified by the improvement in the quality of the decompressed image.

Since a block loses much of its high frequency information in the compression process, inferring the direction of an image edge from pixels within the block can be difficult. Examining pixels that are members of neighboring blocks and adjacent to the block boundaries 14, 16, 18, and 20 increases the area of the image subject to examination and improves the accuracy of the results. Corresponding pairs of pixels to be compared are located along projections parallel to each of the candidate axes 30, 32, 34, and 36 and in the vicinities of opposing block boundaries. For example, projections 38 and 40 parallel to candidate axis 36 are used to identify pixels (1,0) 42 and (0,1) 44 and (3,0) 46 and (0,3) 48 in the vicinities of block boundaries 14 and 18 for comparison. Sub-sampling by a factor of two has been found to produce sufficient data points to identify the dominant edge direction and reduces the computational requirements. As a result, five pairs of pixels are investigated for the horizontal (k=0) 30 and vertical (k=2) 32 axes and nine pairs of pixels are investigated for the diagonal axes (k=1) 36 and (k=3) 34. Sub-sampling by a factor of two produces an exemplary data set as follows for an 8×8 block, where $P_k^1$ and $P_k^2$ are pixels of corresponding pairs on opposing block boundaries:

| k | $P_k^1$ | $P_k^2$ |
|---|---------|---------|
| 0 | {(0,0), (1,0), . . . , (N + 1,0)} | {(0,N + 1), (1,N + 1), . . . , (N + 1,N + 1)} |
| 1 | {(0,1), . . . , (0,N + 1), . . . (N,N + 1)} | {(1,0), . . . , (N + 1,0), . . . , (N + 1,N)} |
| 2 | {(0,0), (0,1), . . . , (0,N + 1)} | {(N + 1,0), (N+ 1,1), . . . , (N + 1, N + 1)} |
| 3 | {(0,N), . . . , (0,0), . . . , (N,0)} | {(1,N + 1, . . . , (N + 1,N + 1), . . . , (N + 1,1)} |

The dominant direction of an image edge in a pixel block is identified by the candidate axis corresponding to the minimum sum of the mean absolute differences of the pixel values for each of the pluralities of corresponding pixels selected for investigation. In other words:

$$k_{min} = arg\ MIN_{\{0 \leq k \leq 3\}} |P_k^1 - P_k^2|/DIM(P_k^1)$$

where:

$|P_k^1 - P_k^2|/DIM(P_k^1)$ = the mean absolute difference of the corresponding pixels in the set of projection data in the direction of axis k $k_{min}$ = the candidate axis returning the minimum argument The difference between pixels at opposing boundaries on projections parallel to the edge 22 is assumed to be less than the differences between pixels sampled in the direction of candidate axes 30, 32, and 34 which lie on opposites the significant color or grayscale difference that characterizes an edge, such as edge 22. The candidate direction that produces the minimum sum is taken as the dominant direction of the edge 22 in the block 12 for the purpose of orienting the filtering axis for filtering the pixels of block 12.

Following determination of the dominant image edge direction, groups of contiguous pixels 49 ($V_0, \ldots, V_9$) (filtering segments) (indicated by a bracket) bisected by the block boundary 14 and parallel to the identified edge direction or filtering axis are identified for selective low pass filtering 108.

To avoid over smoothing the image, the two pixels of the filtering segment adjacent to the block boundary ($V_4$ and $V_5$) 50 and 52 are tested against two thresholds 110. First, if the absolute value of the difference between the pixels ($V_4$ and $V_5$) 50 and 52 adjacent to the block boundary 14 is greater than twice the quantization parameter (QP), the pixels likely represent an image edge and filtering is not applied to avoid reducing the sharpness of the edge. On the other hand, filtering is not applied if the absolute value of the difference between pixels 50 and 52 adjacent to the block boundary 14 is less a predefined boundary threshold (BD_THR) because the difference between the colors or grayscale of the pixels is insufficient to cause a visible blocking artifact. If the difference between pixels 50 and 52 of the filtering segment 48 adjacent to the block boundary is outside the upper and lower bounds established by these tests, then the next filtering segment is selected 112 without applying filtering to the current segment.

If the difference between the pixels 50 and 52 adjacent to the boundary is within the upper and lower bounds, filtering of the segment is warranted and the continuity of the color or grayscale along the filtering segment is checked 114. A significant difference between adjacent pixels in a filtering segment, except at the block boundary, is a probable indication of a detail within the block. The purpose of the discontinuity check 114 is to detect such a variation and limit filtering to a range of pixels within the segment so that filtering is not applied to the pixels representing the detail. Starting at $V_4$ 50, the difference between the value of $V_4$ ($V_i$) and next contiguous pixel further removed from the boundary ($V_3$) 54 is compared to a threshold (THRED). Likewise, the difference between pixel $V_3$ 54 and pixel $V_2$ 56 and each successive pair of pixels farther from the block boundary 14 will be compared to the threshold (THRED). If the difference for a pair of pixels exceeds the threshold (THRED), the pixel nearer the block boundary 14 is chosen as the lower bound to the filtering segment 49. Likewise, a discontinuity check is performed, beginning at $V_5$ 52, to establish an upper bound to the segment. A filtering range comprising the portion of the filtering segment 49 including the pixels between the upper and lower bound produced by the discontinuity check ($V_{LB} \ldots V_{UB}$) and including at least one pixel on each side of the boundary is filtered. The threshold may be a function of the quantization parameter (QP) and the absolute value of the difference between the pixels adjacent to the boundary ($|V_4-V_5|$). The threshold also may differ for blocks with different characteristics. For example, blocks might be characterized on the basis of the mean difference between pixels on opposing boundaries of the block as identified in the image edge direction identification step 108. For example, a block might be typified as:

(a) simple, strong edge type if: Min_dif<THR_edge 1 and Max_dif−Min_dif>THR_edge 2

(b) smooth if: Max_dif<THR_smooth (c) complex if: the relationship of Min_dif and Max_dif is otherwise where:

Min_dif=the mean absolute difference in values corresponding to $k_{min}$

Max_dif=the mean absolute difference in values corresponding to $k_{max}$

THR_edge 1=threshold edge 1

THR_edge 2=threshold edge 2

THR_smooth=threshold of smooth transition $k_{min} = arg \, \text{MIN}_{\{0 \leq k \leq 3\}} |P_k^1 - P_k^2|/DIM(P_k^1)$ $k_{max} = arg \, \text{MAX}_{\{0 \leq k \leq 3\}} |P_k^1 - P_k^2|/DIM(P_k^1)$ $|P_k^1 - P_k^2|/DIM(P_k^1)$=the mean absolute difference of the corresponding pixels in the set of projection data in the direction of axis k $k_{min}$=the axis producing the minimum argument $k_{max}$=the axis producing the maximum argument For example, the threshold (THRED) might be increased to facilitate more aggressive filtering of filtering segments in blocks classified as possessing a simple, strong edge. The threshold (THRED) can also be set to a level sufficient to avoid filtering details in the block while allowing filtering of the pixels of the ringing artifact 28. Pixel repetition or symmetric extension may be used for filtering pixels near the segment boundary ($V_{LB}, \ldots V_{UB}$).

Following determination of the filtering range, the pixels of the filtering range ($V_{LB} \ldots V_{UB}$) are filtered 116 and the method selects the filtering segment for processing 112. Filtering is necessary only along the left vertical boundary 14 and the lower horizontal boundary 20 of the block 12 because filtering is usually applied in the direction of the raster scan and the remaining block boundaries 16 and 18 are subject to filtering when the neighboring blocks are filtered. Any low pass filter may be used for filtering the filtering range. A seven tap filter that has been found to produce acceptable image quality can be implemented as described in TABLE A.

In addition, a short filter mode may also be provided for in the method of the present invention. A large variation in intensity for the pixels of the filtering segment 49 indicates that the segment is in an area of the image 10 having a high level of detail texture. If this is the case, the short filtering mode can be selected and the values of the two pixels 50 and 52 adjacent to the block boundary 14 replaced by their average value to reduce the blocking effect.

The method of the present invention is also useful for post-processing the image of an interlaced video field. Since the two fields often undergo different operations during compression (for example, motion estimation or compensation and DCT coding), it is advantageous to apply post-processing separately to the images represented by the individual fields. Applying post-processing separately to the fields avoids the complication of block classification and confusing an intensity change between fields (resulting from either field capture or compression) as an image edge. Identifying an intensity change between fields as an image edge is a particular problem at the boundaries of moving objects. Slightly better performance may also be possible if adaptive separation is based on the mode of compression of each macro-block (field or frame motion compensation).

All the references cited herein are incorporated by reference.

The terms and expressions that have been employed in the foregoing specification are used as terms of description and not of limitation, and there is no intention, in the use of such terms and expressions, of excluding equivalents of the

TABLE A

Implementation of a seven tap filter

```
/* LPF7:(1 2 3 4 3 2 1)/16 */
    /* v[i]: segment of input data to be filtered
       u[i]: segment of output data
          LB, HB: lower bound and upper bound of the smaller
          segment that is actually filtered */
    for(l=-3, psum=4; l<=3;l++)
    {
       if(l+LB>=0) psum+=v[l+LB];
       else psum+=v[0];
    }
    for (l=LB; l<HB; l++)
    {
       switch (l)
       {
       case 1:
       u[l] = (((psum + v[l]) << 1)+(v[2] - v[4])) >> 4;
       psum+=v[5]-v[0];
       break;
       case 2:
       u[l] = (((psum + v[l]) << 1)+(v[3]+v[1]) - (v[5] + v[0])) >> 4;
       psum+=v[6]-v[0];
       break;
       case 3:
       u[l] = (((psum + v[l]) << 1)+(v[4]+v[2]) - (v[6] + v[0])) >> 4;
       psum+=v[7]-v[0];
       break;
       case 4:
       u[l] = (((psum + v[l]) << 1)+(v[5]+v[3]) - (v[7] + v[1])) >> 4;
       psum+=v[8]-v[1];
       break;
       case 5:
       u[l] = (((psum + v[l]) << 1)+(v[6]+v[4]) - (v[8] + v[2])) >> 4;
       psum+=v[9]-v[2];
       break;
       case 6:
       u[l] = (((psum + v[l]) << 1)+(v[7]+v[5]) - (v[9] + v[3])) >> 4;
       psum+=v[9]-v[3];
       break;
       case 7:
       u[l] = (((psum + v[l]) << 1)+(v[8]+v[6]) - (v[9] + v[4])) >> 4;
       psum+=v[9]-v[4];
       break;
       case 8:
       u[l] = (((psum + v[l]) << 1)+(v[7]-v[5])) >> 4;
       break;
       }
    }
}
```

What is claimed is:

1. A method of post processing a decompressed image comprising the steps of:
   (a) selecting a block of image pixels for filtering as a function of a quantization parameter and a quantization parameter threshold;
   (b) detecting an approximate direction of an image edge in a block of image pixels and establishing a filtering axis relatively parallel to said direction, wherein the step of establishing a filtering axis relatively parallel to an image edge in said block comprises the steps of:
      (i) designating a plurality of candidate axes;
      (ii) identifying a first pixel and a second pixel located on a projection parallel to a candidate axis, said first pixel located in a vicinity of a first boundary of said block and said second pixel located in a vicinity of a second boundary;
      (iii) determining a difference between said first pixel and said second pixel;
      (iv) repeating steps (ii) and (iii) for said plurality of candidate axes; and
      (v) identifying as said filtering axis said candidate axis corresponding to a function of a minimum difference between said first and said second pixels;
   (c) identifying a filtering segment comprising a plurality of contiguous pixels arrayed substantially parallel to said filtering axis and intersected by a boundary of said block;
   (d) selectively filtering said pixels of said filtering segment.

2. The method of claim 1 comprising the further step of designating said filtering segment subject to filtering if a pair of pixels of said filtering segment adjacent to said boundary satisfies a predetermined relationship to a threshold.

3. The method of claim 2 wherein the step of designating said filtering segment subject to filtering a pair of pixels of said filtering segment adjacent to a boundary of said block satisfies a predetermined relationship to a threshold comprises the steps of:
   (a) comparing a difference between said pair of pixels to an upper boundary threshold; and
   (b) comparing said difference between said pair of pixels to a lower boundary threshold.

4. The method of claim 3 wherein said lower boundary threshold is a function of a quantization parameter for said block.

5. The method of claim 1 comprising the further steps of:
   (a) designating at least one pixel on each side of said boundary as a filtering range; and
   (b) filtering said pixels of said filtering range.

6. The method of claim 5 wherein the step of designating at least one pixel on each side of said boundary as a filtering range comprises the steps of:
   (a) selecting a pixel of said filtering segment adjacent to said boundary for inclusion in said filtering range; and
   (b) successively including in said filtering range a next contiguous pixel until a difference between a last pixel included in said filtering range and said next contiguous pixel exceeds a continuity threshold.

7. The method of claim 6 wherein said continuity threshold is a function of a quantization parameter for said block.

8. The method of claim 6 wherein said continuity threshold is a function of a difference between a first pixel located in a vicinity of a first boundary of said block and a second pixel located in a vicinity of an opposing second boundary of said block.

9. A method of post processing a decompressed image comprising the steps of:
   (a) identifying a block of image pixels defined by a block boundary;
   (b) comparing a quantization parameter applicable to said block to a threshold quantization parameter;
   (c) selecting a pixel pair arrayed on each of a plurality of projections parallel to a plurality of candidate filtering axes, if said block quantization parameter exceeds said threshold quantization parameter;
   (d) summing the mean difference between pixels of said pixel pair for each of said plurality of projections for each of said candidate filtering axes;
   (e) selecting said candidate filtering axis corresponding to a least of said sum of said difference between pixels of said pixel pair as a filtering axis;
      (ii) identifying a first pixel and a second pixel located on a projection parallel to a candidate axis, said first pixel located in a vicinity of a first boundary of said block and said second pixel located in a vicinity of a second boundary;

(iii) determining a difference between said first pixel and said second pixel;

(iv) repeating steps (ii) and (iii) for said plurality of candidate axes; and (v) identifying as said filtering axis said candidate axis corresponding to a function of a minimum difference between said first and said second pixels;

(c) identifying a filtering segment comprising a plurality of contiguous pixels arrayed substantially parallel to said filtering axis and intersected by a boundary of said block; and (d) selectively filtering said pixels of said filtering segment.

10. The method of claim 9 further comprising the steps of:

(a) comparing a difference between pixels of a contiguous filtering segment pixel pair to a continuity threshold;

(b) repeating step (a) for filtering segment pixel pairs located successively more remote from said block boundary until said difference exceeds said continuity threshold; and (c) limiting said filtering range to an array of successively more remote filtering segment pixels on each side of said block boundary; each pixel being a member of a filtering segment pixel pair characterized by said difference being less said continuity threshold.

11. A method of post processing a decompressed image comprising the steps of:

(a) selecting a block of image pixels for filtering as a function of a quantization parameter and a quantization parameter threshold;

(b) establishing a filtering axis relatively parallel to an image edge in said block wherein the step of establishing a filtering axis relatively parallel to an image edge in said block in said block comprises the steps of:

(i) designating a plurality of candidate axes;

each side of said boundary as a filtering range comprises the steps of:

(i) selecting a pixel of said filtering segment adjacent to said boundary for inclusion in said filtering range; and (ii) successively including in said filtering range a next contiguous pixel until a difference between a last pixel included in said filtering range and said next contiguous pixel exceeds a continuity threshold; and (f) filtering said pixels of said filtering range.

12. A method of post processing a decompressed image comprising the steps of:

(a) selecting a block of image pixels for filtering as a function of a quantization parameter and a quantization parameter threshold;

(b) establishing a filtering axis relatively parallel to an image edge in said block;

(c) identifying a filtering segment comprising a plurality of contiguous pixels arrayed substantially parallel to said filtering axis and intersected by a boundary of said block; and (d) selectively filtering said pixels of said filtering segment;

(e) designating at least one pixel on each side of said boundary as a filtering range wherein the step of designating at least one pixel on (f) identifying a filtering segment comprising a plurality of filtering segment pixels arrayed in a direction parallel to said filtering axis;

(g) identifying a filtering range comprising at least one said filtering segment pixel on each side of said block boundary; and (h) filtering said filtering segment pixels of said filtering range to smooth said decompressed image.

13. The method of claim 12 wherein said continuity threshold is a function of a quantization parameter for said block.

14. The method of claim 12 wherein said continuity threshold is a function of a difference between a first pixel located in a vicinity of a first boundary of said block and a second pixel located in a vicinity of an opposing second boundary of said block.

* * * * *